United States Patent [19]

Twerdochlib

[11] Patent Number: 4,787,408
[45] Date of Patent: Nov. 29, 1988

[54] FAIL SAFE VALVE FOR AN AIR INLEAKAGE MONITORING SYSTEM IN A STEAM TURBINE

[75] Inventor: Michael Twerdochlib, Oviedo, Fla.

[73] Assignee: Westinghouse Electric Corp., Pittsburgh, Pa.

[21] Appl. No.: 49,493

[22] Filed: May 14, 1987

[51] Int. Cl.[4] .......................................... F16K 31/126
[52] U.S. Cl. ......................................... 137/14; 91/31; 137/852; 251/61.1
[58] Field of Search .................. 251/61.1, 5; 91/31; 137/843, 852, 14

[56] References Cited

U.S. PATENT DOCUMENTS

| 851,709 | 4/1907 | Thompson | 91/31 X |
|---|---|---|---|
| 4,135,550 | 1/1979 | Andersson | 251/5 X |
| 4,178,938 | 12/1979 | Au | 251/61.1 X |
| 4,272,021 | 6/1981 | Standal | 137/852 X |
| 4,340,079 | 7/1982 | Smith | 251/61.1 X |
| 4,522,116 | 6/1985 | Tartaglino | 251/61.1 X |

FOREIGN PATENT DOCUMENTS

| 1122337 | 1/1962 | Fed. Rep. of Germany | 251/61.1 |
|---|---|---|---|
| 2641196 | 3/1978 | Fed. Rep. of Germany | 251/61.1 |
| 2801605 | 7/1978 | Fed. Rep. of Germany | 251/61.1 |

Primary Examiner—Robert G. Nilson

[57] ABSTRACT

A normally closed valve system for sealing off low pressure gas flow through a pipe. The valve comprises an inflatable bladder which blocks relatively low pressure flow through the pipe and permits relatively high pressure flow through the pipe. In one form, the invention comprises a fail-safe bypass monitor and method for measuring air inleakage in a steam turbine. The monitor selectably bypasses low volumetric flow rates from a pipe for measurement and admits flow through the pipe whenever the flow rate exceeds a predetermined value.

6 Claims, 2 Drawing Sheets

FAIL SAFE VALVE FOR AN AIR INLEAKAGE MONITORING SYSTEM IN A STEAM TURBINE

This invention relates to flowmeter monitoring systems and, more particularly, to a fail-safe bypass system for continuously monitoring low pressure gas flow in a closed pipe and for providing pressure relief in the event of a sudden increase in the volumetric flow rate through the pipe.

BACKGROUND OF THE INVENTION

Volumetric flow rates at which gases travel through closed pipes are at times measured by placing a flowmeter directly in the pipe flow path. When relatively low levels of flow, e.g., two to fifty cubic feet per minute (CFM), are monitored in relatively large pipes, e.g., pipes six or more inches in diameter, the low level flow may be bypassed through a smaller pipe in order to increase the velocity of fluid flow and thereby improve the accuracy of measurement. For example, air inleakage in steam turbines is actively exhausted in order to minimize corrosion of turbine components and to reduce vibration in low pressure turbine blading. Efforts are made to keep air inleakage rates below ten CFM during normal operating conditions, but rates may range up to 400 CFM during turbine start up. High compression ratio pump designed to exhaust this wide range of flow must operate under low back pressure. Otherwise, excessive exhaust back pressures may damage the pump seals. Consequently, the vent pipes which exhaust this air at least six inches in diameter and may be larger for long pipe lengths in order to minimize rises in back pressure when the pumps displace large volumes of air.

Flowmeters which have been used for measuring volumetric exhaust rates in these vent pipes have required a minimum flow velocity of approximately 50 feet per minute in order to maintain an acceptable level of accuracy. However, the velocity of a one CFM flow through a six inch pipe is on the order of only five feet per minute. Therefore it has been necessary to bypass turbine exhaust air through a flow monitor having a markedly smaller inside diameter than the vent pipe in order to bring the exhaust air velocity into an acceptable range for measuring volumetric flow rates. When a flowmeter is connected in parallel with the vent pipe, the bypass valve used to divert exhaust flow to the flowmeter must completely seal off the vent seal in order to sustain accurate measurements. During normal low flow operations the valve remains closed in order to effect continuous monitoring. When the exhaust flow rate increases, e.g., due to a sudden inleakage of air to the turbine system, the bypass valve must be quickly opened in order to avoid excessive back pressure which would result from moving the increased volume of gas through the relatively small diameter flowmeter pipe.

Valves which have been used in the past for bypassing exhaust air to a flowmeter are believed to have several undesirable limitations. For example, wear along metallic closing surfaces of conventional stop valves may result in a failure to create a tight seal. The resulting leakage through the stop valve may escape detection and result in spurious flow data. Secondly, valves of the type which have been used in the past for bypassing exhaust air are known to occasionally stick in a closed position, thereby presenting a potential cause of damage to the turbine system. A fail-safe open bypass valve would provide the fullest protection to the turbine blading and the pump seals when back pressure increases. It is therefore desirable to have a bypass valve which provides a seal when closed and which reliably vents exhaust gas when back pressure exceeds a predetermined safe value.

SUMMARY OF THE INVENTION

It is an object of the invention to provide a bypass valve which seals off flow to an exhaust vent pipe under relatively low pressures and which freely opens when gas pressure exceeds a minimum value.

It is another object of the invention to provide an improved bypass valve which is relatively inexpensive and reliable.

It is a further object of the present invention to provide an improved normally closed bypass valve which is fail-safe open.

It is still another object of the invention to provide a method for measuring normally low pressure gas flow rates with the improved bypass valve system.

In one form, the present invention comprises a normally closed, fast acting valve in which the valve is an inflatable bladder positioned in a large diameter flow tube. The valve is closed by inflating the bladder with suitably low pressure gas to seal off relatively low pressure flow through the tube. The valve is opened by exhausting the gas from the bladder. in a failure mode, pressure in the tube in excess of bladder pressure will sufficiently collapse the bladder so as to allow fluid in the tube to flow around the bladder.

In a preferred embodiment of the invention, the novel bladder valve is positioned in a fail-safe bypass monitor to divert low pressure gases being exhausted through a steam turbine vent pipe to a flowmeter. When the exhaust pressure of air in leakage entering the flowmeter exceeds a predetermined value, the bladder valve opens to freely exhaust the gases through the vent pipe. The method for measuring flow rates with the bypass monitor comprises the steps of inflating the bladder to seal off low pressure gas flow through the vent pipe and monitoring the flow rate of gas diverted through the flowmeter while the bladder is inflated.

BRIEF DESCRIPTION OF THE DRAWINGS

For a better understanding of the present invention, reference may be had to the following detailed description taken in conjunction with the accompanying drawing in which.

DETAILED DESCRIPTION OF THE PREFERRED EMBODIMENT

Figure 1:
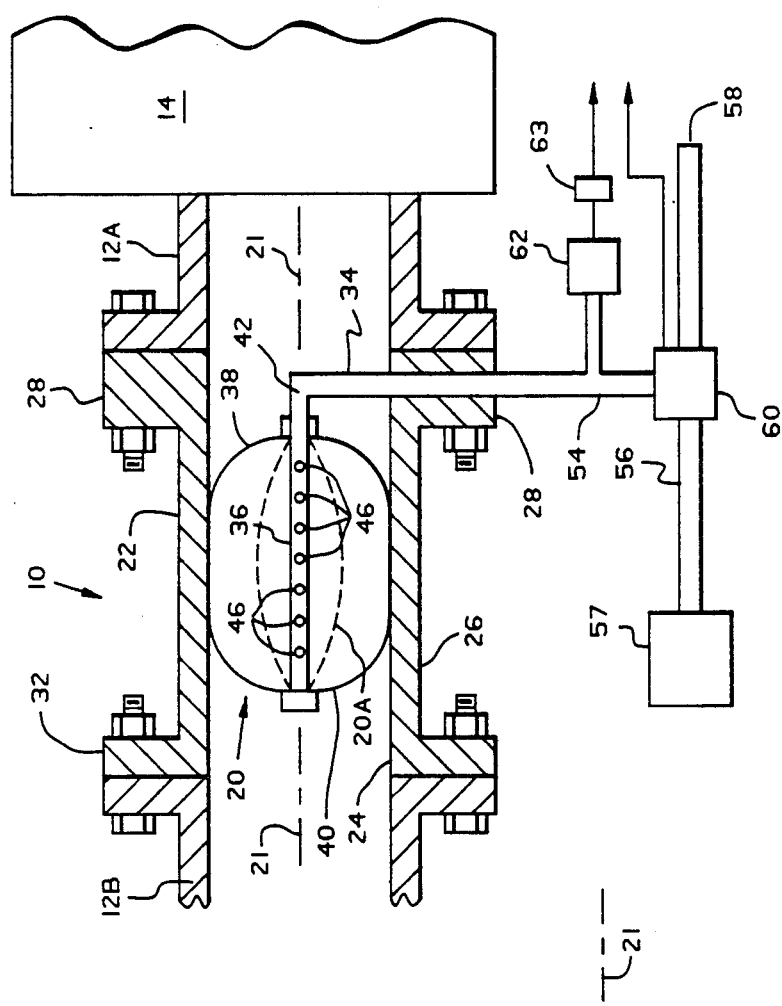
FIG. 1 is a partial cross-sectional view taken transverse to a direction of flow for illustrating one form of the inventive bypass valve.

With reference to FIG. 1 there is illustrated in one form of the invention a bypass valve system 10 for sealng off a normally low pressure gas flow between first and second segments 12A and 12B of a vent pipe which removes air inleakage from a large steam turbine system 14. In a preferred embodiment of the invention the bypass valve system 10 comprises an inflatable bladder 20 positioned about a central axis 21 within a tube 22 having an annular inner wall 24, an outer wall 26, a first end 28 adapted for connection to the first vent pipe segment 12A and a second tube end 32 adapted for connection to the second vent pipe segment 12B. The bladder 20 may be formed from an elastomeric material such as, for example, vulcanized or synthetic rubber.

A rigid bladder pipe 34 extends into the tube 22 through the inner wall 24 to transmit inflation gas to and from the bladdre 20 and to secure the bladder against flow forces along the tube. The bladder 20 is removably supported along its axis by a cannula 36 extending hermetically through a first end 38 of the bladder 20 to a second end 40 of the bladder. The first end 42 of the cannula 36 is releasably threaded to the bladder pipe 34. The cannula 36 includes a plurality of spaced apart openings 46 to effect rapid inflation of the bladder 20 from a collapsed state indicated by phantom lines 20A in FIG. 1.

An exterior segment 54 of the bladder pipe 34 which extends out of the tube 22 is selectably connected in fluid communication with either a gas supply line 56 or a vent 58 by means of a two position solenoid valve 60. The supply line 56 receives pressurized gas from an inflation pump 57. The pressure of the gas provided by the inflation pump 57 is slightly greater, e.g., less than one psig, than the relatively low pressure gas normally flowing through the first vent pipe segment 12A. A pressure monitor 62, connected along the exterior segment 54 of the bladder pipe 34 is in fluid communication with the bladder 20. The pressure monitor 62 is coupled to an electric or hydraulic switch 63 which provides a warning signal when bladder pressure falls below the minimum pressure needed to fully inflate the bladder 20. The warning signal, provided by the switch 63 when the bladder pipe 34 is connected to the gas supply line 56, indicates that a significant gas leak exists in the bladder 20 which prevents the bladder 20 from becoming fully inflated. A flow impedance may be added to the gas supply line 56 between the inflation pump 57 and the solenoid valve 60 in order to detect less significant gas leaks.

Figure 2:
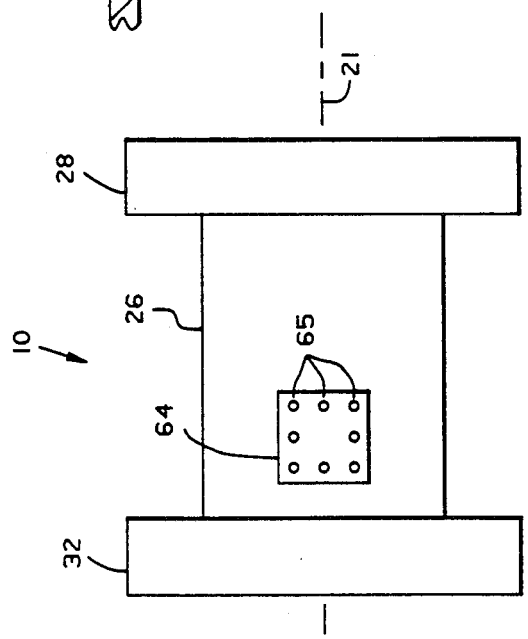
FIG. 2 is an external view of the valve 10 of FIG. 1.

Referring now to FIG. 2, the tube 22 includes a pressure sealed maintenance access panel 64. The access panel 64 is positioned with a plurality of bolts 65 against the outer tube wall 26 adjacent the second tube end 32. Removal of the access panel 64 provides a means for uncoupling the cannula 36 from the bladder pipe 34 and replacing the bladder 20.

The method for operating the bypass valve system (10) to seal off a normally low pressure gas flow includes the step of positioning the solenoid valve (60) to place the bladder (20) in fluid communication with the gas supply line (56). When this occurs the bladder (20) inflates to the inflation pump pressure. The supply line (56) is kept in fluid communication with the bladder (20) in order to overcome minor bladder leaks. If gas leaks prevent the bladder (20) from fully inflating a warning signal is provided by the electric or hydraulic switch (63). When the pressure of gas flow between the first and second vent pipe segments 12A and 12B exceeds a preselected value, the solenoid valve 60 may be repositioned to place the bladder 20 in fluid communication with the vent 58 causing the bladder to deflate.

Figure 3:
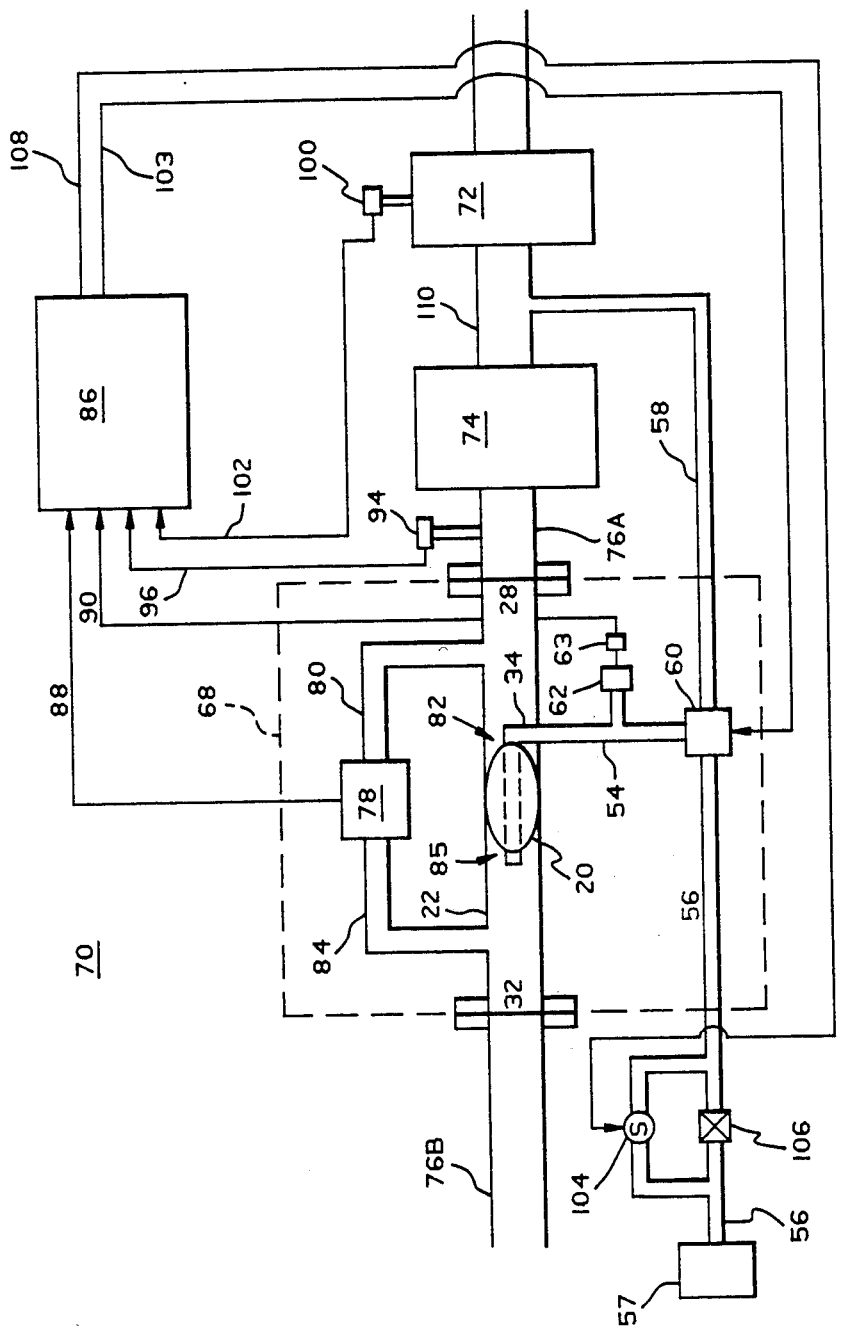
FIG. 3 is a schematic representation of a bypass flowmeter monitoring system for a steam turbine utilizing the bypass valve of FIG. 1.

FIG. 3 illustrates in a preferred embodiment of the invention a bypass valve system 68 positioned in a novel bypass monitor 70 for measuring the volumetric flow rate of air inleakage being evacuated from the condenser 72 of a steam turbine system. Reference numbers in FIG. 3 which correspond to reference numbers in FIG. 1 refer to similar components previously described for the bypass valve system 10.

The bladder valve system 68 is positioned between first and second vent pipe segments 76A and 76B. An exhaust pump 74, positioned between the first vent pipe segment 76A and the condenser 72, evacuates air inleakage from the condenser 72 through the vent pipe segments 76A and 76B. The exhaust pump 74 may comprise a vacuum pump or a hogger in combination with a steam ejector. A flowmeter 78 is positioned to receive gas from a first small diameter pipe 80 connected to the tube 22 on a first side 82 of the inflatable bladder 20 and adjacent the first tube end 28. A second small diameter pipe 84 is positioned to return gas from the flowmeter 78 to the tube 22 on a second side 85 of the inflatable bladder 20 adjacent the second tube end 32.

An electrical circuit or microprocessor based controller 86 is coupled through first and second signal lines 88 and 90 to monitor data from the flowmeter 78 and the pressure switch 63. A second pressure monitor 94, positioned between the vacuum pump 74 and the bypass valve system 68, provides the controller 86, through a third line 96, a signal indicating whether there is a relatively high back pressure in the pipe 80. A third pressure monitor 100, positioned in the condenser 72, provides an early warning of increased air inleakage and corresponding relatively high condenser back pressure to the controller 86 through a fourth signal line 102.

Based on preselected criteria the controller 86 regulates the position of the solenoid valve 60 through a fifth signal line 103 to either provide the bladder 20 with inflation pressure from the gas supply line 56 or to deflate the bladder 20 through the vent 58. If rapid bladder inflation is desired, the pump 57 may be a relatively high volume gas source connected through the parallel combination of a fast closing solenoid stop valve 104 and a flow impedance 106.

The controller 86 operates a solenoid stop valve 104 through a sixth signal line 108 to provide short bursts of relatively high volume flow gas from the pump 57 for inflating the bladder 20. When the solenoid valve 104 is shut a parallel impedance 106, which may be a small diameter orifice, provides a constant source of low pressure, low volume gas flow through the supply line 56 for maintaining bladder inflation pressure. This impedance 106 increases the sensitivity of the pressure monitor 62 for detecting small bladder leaks. In order to rapidly deflate the bladder 20, the vent 58 is coupled to the partial vacuum provided by the pump 74 along the relatively low pressure pipe 110 between the pump 74 and the condenser 72.

The method for measuring flow rates with the bypass monitor 70 is as follows. Under steady state turbine conditions, when air inleakage is expected to be relatively low, flow from the exhaust pump 74 may be diverted to the flowmeter 78 without causing significant pump back pressure. Upon a determination that back pressures measured by the monitors 94 and 100 are acceptably low, the controller 86 provides a signal through the fifth signal line 103 to position the solenoid valve 60 to receive gas from the supply line 56 and inflate the bladder 20. This completely seals off the relatively low pressure gas flow directly through the tube 22 to the second vent pipe segment 76B. If the inflation pump 57 and supply line 56 provide a high volume gas source, the fast closing solenoid stop valve 104 will be opened by the controller 86 for a predetermined brief period of time in order to quickly inflate the bladder 20 and seal off flow through the second vent pipe segment 76B. After the controller 86 closes the solenoid stop valve 104, a relatively low maximum flow will be sustained through the impedance 106 in order to overcome any minor inflation leaks in the bladder 20. Larger leaks, preventing full inflation of the bladder 20, are detected by the controller 86 through the pressure switch 63. With the bladder 20 inflated the flowmeter 78 provides the controller 86 with a signal through line 88 which is indicative of volumetric gas flow rate between the first and second pipe segments 76A and 76B.

A controller commnd is sent through the fifth signal line 103 to open the bypass valve 68 whenever a signal from the flowmeter 78 or from either of the pressure monitors 94 and 100 exceeds a preselected value. The solenoid valve 60 responds to the controller command by sealing off the supply line 56 and opening flow from the bladder pipe 34 through the vent 58. If the vent 58 is open to the atmosphere, the bladder 20 will collapse under its own elastomeric forces and any back pressure in the tube 22. If the vent 58 is coupled to the partial vacuum of the relatively low pressure pipe 110 the bladder will more quickly collapse. If controller regulation of the bypass valve system 68 is rendered ineffective or if the solenoid valve 60 becomes stuck, leaving the supply line 56 coupled to the bladder 20, the bypass valve system 68 will nevertheless allow air to pass once the vacuum pump back pressure exceeds the inflation pressure provided by the supply line 56. When pressure measured by either of the monitors 94 or 100 is used as a criterion for deflating the bladder 20, the controller 86 may be programmed to delay inflation of the bladder 20 for a predetermined period after bladder deflation occurs. This prevents continuous repetitive cycling of the bypass valve between open and closed positions during periods of high air inleakage.

It will be appreciated by those skilled in the art to which the present invention relates that broad application can be given to the novel bypass valve system 10 in many embodiments other than those described herein. It will also be apparent to those skilled in the art that many modifications in structure, components and arrangements illustrated herein may be made in the practice of the invention and for adaptation of the invention to specific functions without departing from the spirit and scope of the invention as defined by the claims.

What is claimed and desired to be secured by letters patent is the following:

1. A fail safe valve system for blocking a normally low pressure gas flow through a pipe segment, said valve system comprising:
   (a) a tube having a first end for receiving gas flow, and a second end adapted for connection to the pipe segment;
   (b) an inflatable bladder positionable in said tube;
   (c) means for inflating said bladder and for securing said bladder against flow forces along said tube comprising:
      (i) a rigid cannula extending centrally and coaxially through said tube for a predetermined length;
      (ii) a rigid bladder pipe connected to an end of said cannula for supporting said cannula in said tube and coupling a supply of gas thereto, said bladder pipe extending through a wall of said tube;
      (iii) means for attaching said bladder to each end of said cannula such that said bladder is stretched between the ends of said cannula; and
   (d) a gas supply connected to said inflating means.

2. The valve system of claim 1 wherein said gas supply comprises a pump, the system including:
   (a) impedance means connected between said gas supply and said bladder for reducing the volumetric flow rate of said gas supply; and
   (b) a solenoid valve connected in parallel with said impedance means for increasing the volumetric flow rate of said gas supply when inflating said bladder.

3. A valve system for sealing off a normally low pressure gas flow through a segment of vent pipe comprising:
   (a) a tube having a first end for receiving a relatively low pressure gas flow and a second end adapted for connection to the segment of vent pipe;
   (b) an inflatable bladder positioned inside said tube for preventing relatively low pressure gas from flowing into the vent pipe segment and for permitting flow of relatively high pressure gas into the vent pipe segment;
   (c) means for inflating said bladder to a preselected pressure intermediate to the relatively low pressure gas and the relatively high pressure gas comprising:
      (i) a rigid cannula extending centrally and coaxially through said tube for a predetermined length;
      (ii) a rigid bladder pipe connected to an end of said cannula for supporting said cannula in said tube and coupling a supply of gas thereto, said bladder pipe extending through a wall of said tube;
      (iii) means for attaching said bladder to each end of said cannula such that said bladder is stretched between the ends of said cannula; and
   (d) selectable connection means, positioned between said inflating means and said bladder, for seleccively inflating and deflating said bladder.

4. Method for sealing off a normally low pressure gas flow through a segment of pipe with an inflatable bladder, the bladder being selectably connected in fluid communication with either a gas source or a vent by means of a two position valve, the method comprising the steps of:
   (a) securing the bladder along the interior of a tube;
   (b) positioning a first end of the tube for receiving gas flow;
   (c) connecting a second end of the tube to the pipe segment;
   (d) positioning the valve to place the bladder in fluid communication with the gas source;
   (e) inflating the bladder to a predetermined pressure which blocks relatively low pressure gas flow through the tube to the pipe segment and which permits relatively high pressure gas flow through the pipe segment; and
   (f) collapsing the bladder when gas flow pressure in the tube exceeds a preselected value.

5. The method of claim 4 wherein the step of collapsing the bladder includes positioning the valve to place the bladder in fluid communication with the vent.

6. The method of claim 5 wherein the gas source comprises a solenoid stop valve in parallel with a flow impedance, each positioned between the gas source and the two position valve, the step of inflating the bladder including the steps of:
   (a) opening the stop valve to inflate the bladder with a high volume gas flow; and
   (b) closing the stop valve to provide a low volume gas flow through the impedance for maintaining bladder inflation pressure.

* * * * *